(12) United States Patent
Maeyama et al.

(10) Patent No.: US 8,667,901 B2
(45) Date of Patent: Mar. 11, 2014

(54) BOGIE FOR GUIDE RAIL TYPE VEHICLE

(75) Inventors: Hiroyuki Maeyama, Tokyo (JP);
Yoshinori Mitsui, Tokyo (JP); Kousuke Katahira, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 136 days.

(21) Appl. No.: 13/144,140

(22) PCT Filed: Aug. 7, 2009

(86) PCT No.: PCT/JP2009/064320
§ 371 (c)(1),
(2), (4) Date: Sep. 26, 2011

(87) PCT Pub. No.: WO2010/095290
PCT Pub. Date: Aug. 26, 2010

(65) Prior Publication Data
US 2012/0097065 A1 Apr. 26, 2012

(30) Foreign Application Priority Data

Feb. 20, 2009 (JP) .................................. 2009-038160

(51) Int. Cl.
*B61F 9/00* (2006.01)
*B61F 5/38* (2006.01)

(52) U.S. Cl.
USPC ..................... 105/215.2; 105/167; 105/199.1; 104/245

(58) Field of Classification Search
USPC ............. 105/215.2, 77.2, 165, 167, 168, 144, 105/199.1; 104/242, 243, 245, 247, 246, 104/119
See application file for complete search history.

(56) References Cited

U.S. PATENT DOCUMENTS

| | | | | |
|---|---|---|---|---|
| 3,690,271 A | * | 9/1972 | Hobbs | 105/4.1 |
| 4,223,611 A | * | 9/1980 | Dawson et al. | 104/247 |
| 2005/0139117 A1 | * | 6/2005 | Ralph et al. | 105/168 |
| 2008/0083345 A1 | | 4/2008 | Morita et al. | |

FOREIGN PATENT DOCUMENTS

| | | |
|---|---|---|
| JP | 51-018687 | 6/1976 |
| JP | 57-081957 U | 5/1982 |
| JP | 58-081857 A | 5/1983 |
| JP | 63-028822 B2 | 6/1988 |

(Continued)

OTHER PUBLICATIONS

International Preliminary Report on Patentability for PCT/JP2009/064320 mailed Aug. 23, 2011.

(Continued)

*Primary Examiner* — Mark Le
(74) *Attorney, Agent, or Firm* — Kanesaka Berner & Partners LLP

(57) ABSTRACT

A bogie for a vehicle which is guided by guide wheels that rotate while keeping contact with a guide rail arranged along a guideway of the vehicle. The bogie comprises a guide frame which includes a pair of transverse beams and a connecting member arranged between the pair of the transverse beams and each of the traverse beams being equipped with the guide wheels rotatably on both ends thereof, an axle supported on a non-turning part of the bogie such that the axle is capable of turning and running wheels which are attached to both ends of the axle. The running wheels are rigidly fixed to the axle and the guide frame is fixed to the axle so as to steer the guide frame, the axle and the running wheels integrally.

7 Claims, 8 Drawing Sheets

(56) References Cited

FOREIGN PATENT DOCUMENTS

| | | |
|---|---|---|
| JP | 1-147164 U | 10/1989 |
| JP | 2-091070 U | 7/1990 |
| JP | 5-022626 B2 | 3/1993 |
| JP | 11-278004 A | 10/1999 |
| JP | 2001-048008 A | 2/2001 |
| JP | 31-088939 B2 | 7/2001 |
| JP | 2003-104198 A | 4/2003 |
| JP | 2003-146204 A | 5/2003 |
| JP | 2008-068829 A | 3/2008 |

OTHER PUBLICATIONS

International Preliminary Report on Patentability for PCT/JP2009/064320 mailed Sep. 13, 2011.
Office Action for Korean Patent Application No. 2011-7018761 issued Jan. 25, 2013.
Railroad Vehicles and Technique, Mar. 1999, pp. 9-19.
International Search Report for PCT/JP2009/064320 mailed Nov. 24, 2009.
KR Notice of Allowance with a mailing date of Jun. 12, 2013 with English Translation (English translation only partially of first page).

* cited by examiner

Sectional view along line A - A

BOGIE FOR GUIDE RAIL TYPE VEHICLE

RELATED APPLICATIONS

The present application is a National Phase of International Application Number PCT/JP2009/064320, filed Aug. 7, 2009, and claims priority from, Japanese Application Number 2009-038160, filed Feb. 20, 2009.

BACKGROUND OF THE INVENTION

1. Field of the Invention

The present invention relates to a bogie for a guide rail type vehicle in which guide wheels roll along a guide rail while being in contact with the guide rail arranged along a guideway thereof so as to drive the vehicle.

2. Description of the Related Art

A new transportation system as a medium-capacity transportation using rubber tires traveling on a special guideway such as a new transit system and MRT, has become popular in recent years. This transportation system is usually fully automated. In some cases, the transportation system is equipped with guide wheels being guided on a guideway.

As one type of the new transit system, there is a vehicle which comprises a pair of front guide wheels which are connected to front rubber tires of a front part of the bogie via a steering mechanism and a pair of rear guide wheels being connected to rear rubber tires of a rear part of the bogie via the steering mechanism so as to steer the front rubber tires and the rear rubber tires by the front guide wheels and the rear guide wheels respectively. For instance, JP5-22626A discloses a vehicle of this type of the new transit system.

In this type of vehicle, the steering direction of the rubber tires has to be changed into a new direction every time when the traveling direction is changed or reversed. Therefore, the vehicle is usually equipped with a forward-backward changeover device for switching the traveling direction forward or backward and the traveling direction is changed at a terminal station by switching the forward-backward changeover device. The switching device is complex in structure and has many wear components, which requires frequent and time-consuming maintenance.

To take measure against this, a bogie for a guide-rail type vehicle is proposed in which instead of the forward-backward changeover device, a pair of guide frames are provided for each bogie and a pair of guide wheels are provided on each of the guide frames.

For instance, one type of the above vehicles is disclosed in Non-Patent Document 1 (March issue of "Railroad Vehicles and Technique" published in 1999, pp. 9-19) discloses a variety of vehicles of this type. The bogie comprises a pair of guide frames, each of which has two guide wheels at both ends thereof, an axle, and a suspension frame connected to the axle via a parallel link mechanism. The bogie is disposed under the vehicle via a turning bearing of a ring shape. Thus, the guide frame, the axle and the rubber tires are firmly connected and the whole bogie turns along with the guide wheels guided on a guide rail.

This type of vehicle is also disclosed in FIG. 4 of Patent Document 1, JP11-278004A and in FIG. 4 to FIG. 6 of Patent Document 2, JP2003-146204A.

The bogie disclosed in Patent Document 1 and Patent Document 2 is structured such that the guide frame, kingpins and the rubber tires are integrally coupled and the guide frame and the rubber tires rotate around the kingpin when the guide wheels receive the force in a width direction with respect to the guide rail.

The bogie disclosed in Non Patent Document 1, rotates around the turning bearing of a ring shape by the side-to-side force that the guide wheels receive from the guide rail. Thus, the load on the guide wheels is high and the durability of the guide wheels becomes short.

Further, in the bogie disclosed in Patent Document 1 and Patent Document 2, the axle does not turn with the rubber tires and thus the weight on the turning part is light compared to the bogie disclosed in Non Patent Document 1 and thus the load on the guide wheels are reduced. However, the right and left guide frames are separately formed and connected respectively to the kingpin. Therefore, the load on the guide wheels are transmitted to the kingpin via the guide frames and the large load is loaded on the kingpin via the guide frames. Therefore, the kingpin and the bearing for supporting the kingpin are subject to breakage. When the kingpin is worn away or when there is misalignment between the kingpin and the bearing, the running stability deteriorates and the height of the guide wheels and the distance between the guide wheels in the lateral direction of the vehicle change, thereby requiring more maintenance of the axle.

Furthermore, when the guide wheels receive irregular external force, it can cause not only the breakage of the guide wheels and the guide frames but also the breakage of the kingpin, which is the most important component of the vehicle to operate the vehicle.

To improve the cornering performance of the vehicle, the king pin is arranged, with a negative camber angle so that the bottom of the wheel is father out of the top. This causes the guide wheels to move in a vertical direction when steering and thus it is necessary to provide a greater width of the guide rail in the vertical direction of the vehicle.

Further, the movement of the guide wheels due to the uneven surface of the guide rail is directly transmitted to the rubber tires, thereby affecting the traveling of the rubber tires and making the traveling unstable. Thus, it is necessary to improve the precision of the guide rail.

RELATED ART DOCUMENT

[Patent Document]
[Patent Document 1] JP11-278004A (FIG. 4)
[Patent Document 2] JP2003-146204A (FIG. 4 to FIG. 6)
[Non-Patent Document]
[Non-Patent Document 1] March 1999 issue of "Railroad Vehicles and Technique" published in 1993, pp. 9-19

SUMMARY OF THE INVENTION

In view of the above issues of the related art, an object of the present invention regarding a bogie for a vehicle of a guide rail type, particularly a bogie used for a vehicle of a new transportation system using rubber tires, is to improve the durability of the bogie and to obtain the stable traveling performance thereof without being affected by an uneven surface of a guide rail by reducing the load on guide wheels and enhancing the rigidity of a bogie components such as a guide frame.

In order to achieve the object, the present invention proposes a bogie for a vehicle of a guide rail type which is guided by guide wheels that rotate while keeping contact with a guide rail arranged along a guideway of the vehicle, the bogie comprising: a guide frame which includes a pair of transverse beams and a connecting member arranged, between the pair of the transverse beams, each of the traverse beams being equipped with the guide wheels rotatably on both ends thereof; an axle which is supported on a non-turning part of the bogie such that the axle is capable of turning; and running wheels which are attached to both ends of the axle, wherein the running wheels are rigidly fixed to the axle and the guide frame is fixed to the axle so as to steer the guide frame, the axle and the running wheels integrally.

When the vehicle advances into the curved section and the switch section of the guideway, the load is exerted on sequentially from the guide wheels of the front side in the traveling direction. According to the present invention, the forward-backward changeover devices is not needed and further the guide frame, the axle and the running wheels are rigidly joined (with rigidity). The axle is rotatably supported with respect to the bogie and the guide frame, the axle and running wheels can be steered together so as to eliminate the kingpin. In this manner, the wear and breakage of the kingpin can be solved.

Among the components of the bogie, only the guide frame 36, the drive shaft 24, the running tires can turn. In contrast, the bogie of Non-Patent Document 1 is steered by turning the whole structure of the bogie. In comparison to the conventional bogie, the bogie of the preferred embodiment is advantageous in the reduced weight of the turning part. Therefore, the inertial force generated at the turning part can be reduced and the load on the guide wheels from the guide rail is also reduced, thereby improving the durability of the guide wheels.

Furthermore, the running wheels are rigidly connected to both ends of the drive shaft respectively and the guide frame and the axle are joined so as to steer the guide frame together with she drive shaft, the axle and the running wheels. Therefore, an installation mechanism for installing the guide frame can be simplified and the number of parts can be reduced, resulting in making the maintenance easier and reducing the maintenance cost.

According to the present invention, it is preferable that the guide frame and the axle are supported rotatably around one of turning shafts and an annular or arc bearing disposed at a center of the bogie, and the non-turning part of the bogie is connected so a body of the vehicle via a traction link arranged in a longitudinal direction of the body of the vehicle.

In this manner, the guide frame is configured to turn around the turning shaft or the bearing of a circular or arc shape arranged on the center part of the bogie so that the turning of the guide frame becomes easy. And the guide frame is joined to the non-turning part by the traction links so as to improve the joint strength of the guide frame and the vehicle body.

In the present invention, the bogie may further comprise stopper members which are respectively arranged, on the axle and the vehicle in such a position that the axle and the vehicle can be locked with each other by the stopper members, the stopper members locking with each other so as to suppress a relative displacement between the axle and the vehicle body in a lateral direction of the vehicle that exceeds an allowable limit value when the displacement reaches the allowable limit value.

In this manner, the relative displacement between the axle and the vehicle body in the lateral direction can be suppressed so as not to exceed the allowable limit value without interfering with the turning of the guide frame.

It is also preferable that the guide wheels are arranged so that a distance between outer edges of the guide wheels on a center side of the vehicle body in a longitudinal direction is smaller than a distance between outer edges of the guide wheels on an edge side of the vehicle in the longitudinal direction. The center side herein is the side closer to the center of the vehicle body in the longitudinal direction while the edge side is the side closer to a front edge or a rear edge of the vehicle body in the longitudinal direction.

With this configuration, similar to such a case that the guide wheels are provided for only one of the front and rear sides of the bogie, unrestricted turning motion of the bogie can be achieved. Therefore, the turning reaction force acting on the guide wheels can be reduced with an instantaneous movement when the vehicle reaches the deformed sections of the guideway such as the curved section and the unpaved section or receives a disturbance.

In the present invention, it is also preferable that the guide wheels disposed on a center side of the vehicle body in a longitudinal direction have a rigidity less than the guide wheels arranged on an edge side of the vehicle body in the longitudinal direction. By this, the unrestricted turning motion of the bogie can be achieved in the amount corresponding to the deflection of the guide wheels on the center side of the vehicle body in a similar manner to the above structure.

In the bogie of the present invention, a turning center of the guide frame may be displaced with respect to a center of the axle toward the edge side of the vehicle body when she bogie is mounted on the front side or rear side of the vehicle body in the traveling direction.

The turning center of the guide frame is displaced with respect to the center of the axle toward the edge side of the vehicle and thus the running wheels are directed to the center line of the guideway by the angle in the amount of the displacement with respect to a direction of the tangent to the curved guideway at the center of the guide wheels. Therefore, the guide wheels are given a slip angle and the cornering force is generated in the direction toward the inside of the curved guideway.

Therefore, in the front bogie, the reaction force exerted on the guide wheels on the outer side of the curve is reduced by the centrifugal force and so on while in the rear bogie, the reaction force exerted on the guide wheels on the inner side of the curve is reduced. By this, the durability of the guide wheels can be enhanced and the life thereof can be enhanced as well.

Further, the turning center of the guide frame is displaced with respect to the center of the axle toward the edge side of the vehicle body so that the running stability of the vehicle can be improved by the trailing effect in the front bogie of the vehicle.

Moreover, the bogie preferably further comprises a restoring device for applying to the guide frame a restoring force that directs the guide wheels in a straight direction, and a damper for suppressing a drastic turning movement of the guide frame. The stable traveling performance of the vehicle can be achieved during the high speed operation by the restoring device and excessive movement of the bogie in the turning direction can be restricted by the damper and the bogie is prevented from being in a vibrational state.

Further, it is preferable in the present invention that the bogie further comprises a shock absorber of a spring type or a rubber type arranged on the guide frame and absorbing impact loaded on the guide wheels from the guide rail. The shock absorber is provided so as to absorb the impact on she guide wheels when the vehicle reaches the curved section or the switch section or when there is an uneven surface or bump on the guide rail. By the shock absorber, the bogie structure such as the guide wheels and the guide frame are protected and also the ride quality of the vehicle is maintained.

According to the present invention, the bogie for the vehicle of the guide rail type which is guided by the guide wheels that rotate while keeping contact with the guide rail arranged along the guideway of the vehicle, and the bogie comprises: the guide frame which includes the pair of transverse beams and the connecting member arranged between the pair of the transverse beams, each of the traverse beams being equipped with the guide wheels rotatably on both ends thereof; the axle which is supported on the non-turning part of the bogie such that the axle is capable of turning; and the running wheels which are attached to both ends of the axle, wherein the running wheels are rigidly fixed to the axle and the guide frame is fixed to the axle so as to steer the guide frame, the axle and the running wheels integrally. In this bogie, neither of the forward-backward changeover means or the kingpin is needed. Therefore, the problems of the conventional case such as the wear and the breakage of the kingpin are solved.

In comparison to the bogie disclosed in Non-Patent Document 1, the bogie of the present invention is advantageous in the reduced weight of the turning part. Therefore, the inertial force generated at the turning part can be reduced and the load on the guide wheels from the guide rail is also reduced, thereby improving the Curability of the guide wheels. Further, the guide mechanism for guiding the bogie can foe simplified and the number of components can be reduced, resulting in making the maintenance easier.

DETAILED DESCRIPTION OF THE PREFERRED EMBODIMENTS

A preferred embodiment of the present invention will now be described in detail with reference to the accompanying drawings. It is intended, however, that unless particularly specified, dimensions, materials, shape, its relative positions and the like shall be interpreted as illustrative only and not limitative of the scope of the present.
(First Preferred Embodiment)

Figure 1:
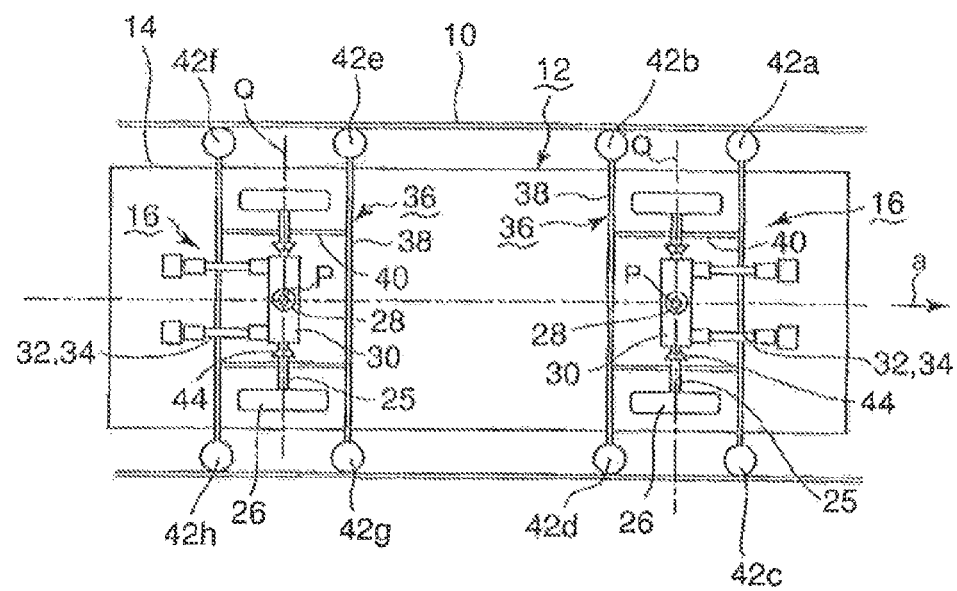
[FIG. 1] A plane view of a vehicle of a guide rail type using a bogie of a first preferred embodiment of the present invention.

A vehicle of a guide rail type using bogies of a first preferred embodiment of the present invention will be described in reference to FIG. 1 and FIG. 2. As shown in FIG. 1, in a new transit system, guide rails 10 are disposed along a guideway T on both sides thereof. A vehicle 12 travels along the guideway T. And two bogies 16 are mounted on each vehicle 12 on a front part and rear part thereof. The bogie 16 has eight guide wheels 42a-42h, which rotate along a guide surface of the guide rail 10 (the guide wheels are also indicated as guide wheels 42). The guide wheels 42 guide the vehicle 12 so that the vehicle 12 travels on the guideway T It is also possible to arrange the guide rail in such a manner that one guide rail arranged in a center of the guideway T is interposed between the guide wheels mounted on the bogie from both sides thereof.

Figure 2:
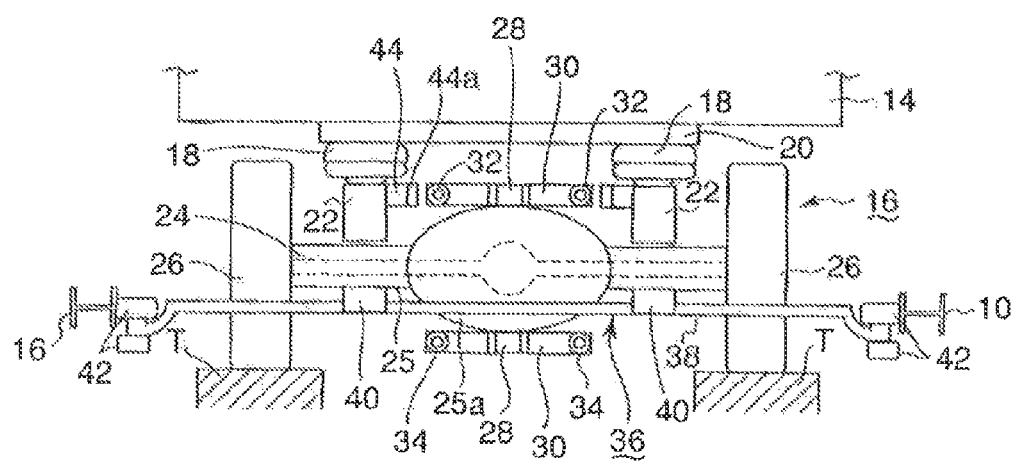
[FIG. 2] A side view of the bogie of the first preferred embodiment.

In FIG. 2, the bogie 16 is installed under the vehicle body 14 via air springs 18 for suspension. Specifically, a suspension frame not shown in the drawing is projected under the vehicle body 14. A base 20 of the suspension frame is fixed to a bottom of the vehicle body 14. And the air springs 18 are installed between the base 20 and a non-turning part 22 of the bogie 16.

A pair of the air springs 18 is provided symmetrically about the center of the vehicle body in a lateral direction of thereof. An axle housing 25 is disposed horizontal in a lateral direction of the vehicle body and houses a drive shaft 24. The drive shaft 24 has rubber tires 26 rigidly fixed on both ends thereof. The rubber tires are filled with gas and equipped with inner safety wheels.

The axle housing 25 has a large part 25a, which houses a differential device. A cylindrical turning pin 28 is fastened from a top surface to a bottom surface of the large part 25a. The turning pin 26 is supported rotatably on a non-turning frame 30. A pair of upper traction links 32 and a pair of lower traction links 34 are disposed symmetrically about the center of the vehicle body in the lateral direction thereof respectively. Upper ends of the traction links 32 and 34 are supported rotatably on the suspension frame not shown in the drawing while lower ends of the traction links 32 and 34 are supported rotatably on the non-turning frame 30. In this manner, the upper traction links 32 and lower traction links 34 form a parallel link mechanism so as to support the axle housing 25 to move parallel in a vertical direction.

A connecting bar 45 of the guide frame 36 is integrally connected to the bottom of the axle housing 25. As illustrated in FIG. 1, the guide frame 36 forms a lattice structure having two traverse bars 38 arranged parallel to the lateral direction of the vehicle body between the rubber tires 26 and two connecting bars 40 connecting idle traverse bars 38.

The guide wheel is mounted rotatably on both ends of each of the traverse bars 38. In this manner, the non-turning part. 22 and the non-turning frame 30 form a non-turning part of the bogie 16 while a turning part of the bogie 16 is formed by the axle housing 25, the drive shaft 24, the guide frame 36 and the rubber tires 36 which are rigidly connected. On both sides of the non-turning frame 30 in the lateral direction of the vehicle body, rigid stoppers 44 are attached to the bottom of the vehicle body 14 in a position opposing to both ends of she non-turning frame 30. The rigid stoppers have rubber plates 44a adhered on the opposing face thereof. Between, the stoppers 44 and the non-turning frame 30, a clearance in the amount of an allowable limit value of the displacement between the vehicle body 14 and the bogie 16 is provided. The stopper members locking with each other so as to suppress a relative displacement between the axle and the vehicle body in a lateral direction of the vehicle that exceeds an allowable limit value when the displacement reaches the allowable limit value.

By this, when the displacement between the vehicle body 14 and the bogie 16 reaches the allowable limit value, the non-turning frame 30 touches the stoppers 44 so as to suppress the relative replacement value exceeding the allowable limit value.

In this preferred embodiment, the turning center P of the guide frame 36 (the center of the turning pin 23) is arranged on the line Q of the drive shaft 24.

With this structure, when the vehicle 12 advances into a curved section or a switch section of the guide way T, the load is loaded sequentially on the front guide wheels 42a and 42b and then on the rear guide wheels. In this preferred embodiment, the forward-backward changeover device is not needed and further with the lattice structure of the guide frame 36, the strength of the guide frame is improved against the load applied in the longitudinal direction and the lateral direction of the vehicle body.

Further, the axle housing 25, the drive shaft 24 and the rubber tires 26 are rigidly connected to the guide frame 36 so as to form a turning part of the bogie. The turning part of the bogie is supported free of turning and the turning part can be steered integrally and thus the kingpin is not needed. In this manner, the issues of the kingpin such as the wearing-out and the breakage thereof can be solved.

Furthermore, among the components of the bogie, only the guide frame 36, the drive shaft 24, the axle housing 25 and the rubber tires 26 can turn. In contrast, the bogie of Non-Patent Document 1 is steered by turning the whole structure of the bogie. In comparison to the conventional bogie, the bogie of the preferred embodiment is advantageous in the reduced weight of the turning part. Therefore, the inertial force generated at the turning part can be reduced and the load on the guide wheels 42 from the guide rail 10 is also reduced, thereby improving the durability of the guide wheels 42.

Furthermore, the rubber tires 26 are rigidly connected to both ends of the drive shaft 24 respectively and the guide frame 36 and the axle housing 25 are connected so as to steer the guide frame together with the drive shaft 24, the axle housing 25 and the rubber tires 26. Therefore, the guide mechanism for guiding the bogie 16 can be simplified and the number of parts can be reduced, resulting in making the maintenance easier and reducing the maintenance cost.

The guide frame 36, the drive shaft 23 and the rubber tires 26 are steered integrally so that the kingpin is not needed, thereby solving the issues such as the breakage of the kingpin The guide frame 36, the drive shaft 24 and the axle housing 25 are turned around the turning pin 28 arranged on the center part of the bogie 16 so that the turning of the guide frame 36 becomes easy. And the guide frame 36 is joined to the non-turning frame 30 of the non-turning part of the bogie is connected by the upper and lower traction links 32 and 34 so as to improve the joint strength of the guide frame 36 and the vehicle body 14.

In the preferred embodiment, the guide wheels may be arranged so that a distance between outer edges of the guide wheels (42b and 42d or 42e and 42g) on a center side of the vehicle body in a longitudinal direction is smaller than a distance between outer edges of the guide wheels (42a and 42c or 42f and 42h) on an edge side of the vehicle in the longitudinal direction. The center side herein is the side closer to the center of the vehicle body in the longitudinal direction while the edge side is the side closer to a front edge or a rear edge of the vehicle body in the longitudinal direction. Similar to such a case that the guide wheels are provided for only one of the traverse beams 38, unrestricted turning motion of the bogie 16 can be achieved in the amount corresponding to the reduced distance. Therefore, the turning reaction force acting on the guide wheels can be reduced with an instantaneous movement when the vehicle reaches the deformed sections of the guideway T such as the curved section and the unpaved section or receives a disturbance.

Alternatively, the guide wheels 42 disposed on a center side of the vehicle body in a longitudinal direction may have a rigidity less than the guide wheels arranged on an edge side of the vehicle body in the longitudinal direction. By this, the unrestricted turning motion of the bogie 16 can be achieved in the amount corresponding to the deflection of the guide wheels on the center side of the vehicle body in a similar manner to the above structure.

(Second Preferred Embodiment)

Figure 3:
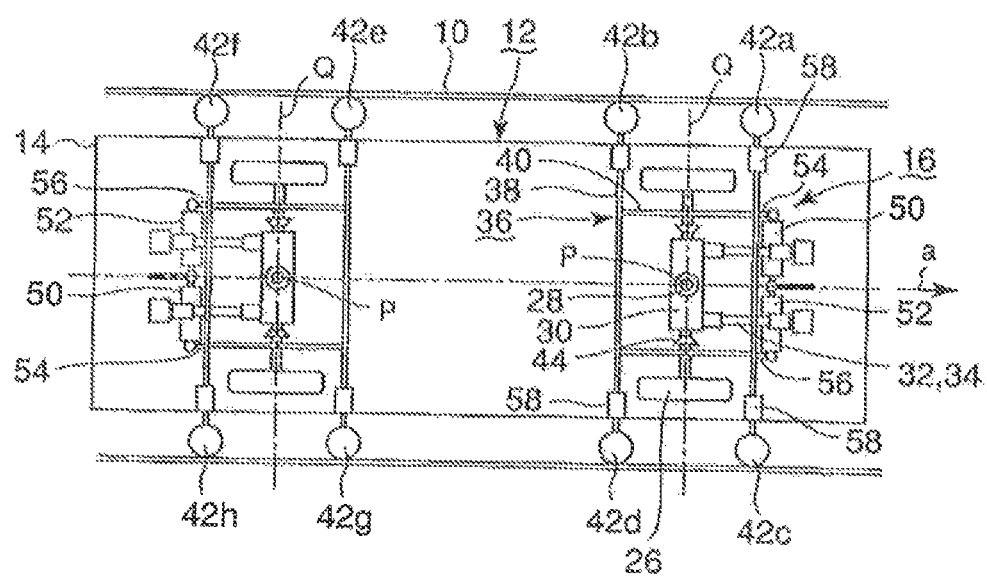
[FIG. 3] A plane view of a vehicle of a guide rail type using a bogie of a second preferred embodiment of the present invention.

Next, a second preferred embodiment will be explained in reference to FIG. 3. In. FIG. 3, the structure of the bogie is the same as the first preferred embodiment except for the following. Specifically, the bogie comprises a restoring rod 50 for applying to the guide frame a restoring force that directs the guide wheels in a straight direction, and a turning damper 52 for suppressing a drastic turning movement of the guide frame. The restoring rod 50 and the turning damper 52 are mounted on the traverse bar of the edge side of the vehicle parallel thereto via the connecting rods 54 and 56.

The restoring rod 50 is structured such that a spring element and a shock-absorbing mechanism of a damping element are connected. The restoring rod applies the force in the direction to restore the guide frame 36 in a neutral position in which the rubber tires 26 are in a straight advancing state. For instance, JP2-210150A shows an example of the rod. The turning damper 52 can be, for instance, a hydraulic damper.

A shock-absorbing rod 58 is installed near the guide wheels 42 mounted on the traverse bar 38. The structure of the shock-absorbing rod 58 is already known. For instance, the a nook absorbing rod 58 has an resilient member inside such as a shock absorbing rubber and when the load is loaded in the axial direction of the traverse bar 38, the shock absorbing rod 58 expands and contract to absorb the shock loaded on the traverse bar 38 from the guide rail 10 (ref. FIG. 3 of Patent Document 1). The shock absorbing rubber can be replaced with a coil spring or the like.

The rest of the structure of she bogie is the same as the first preferred embodiment and the same components are given the same reference numbers and will not be explained further.

According to the preferred embodiment, in addition to the function effect obtained in the first embodiment, the following effect can be obtained as well. Specifically, the stable traveling performance of the vehicle can be achieved during the high speed operation by the restoring rod 50 and excessive movement of the bogie in the turning direction can be restricted by the turning damper 52 and the bogie is prevented from being in a vibrational state.

Moreover, the shock-absorbing rod 58 is provided so as to absorb the impact on the guide wheels 42 when the vehicle reaches the curved section or the switch section or when there is an uneven surface or bump on the guide rail 10. By this, the bogie structure such as the guide wheels 42 and the guide frame 36 are protected and also the ride quality of the vehicle 12 is maintained.

(Third Preferred Embodiment)

Figure 4:
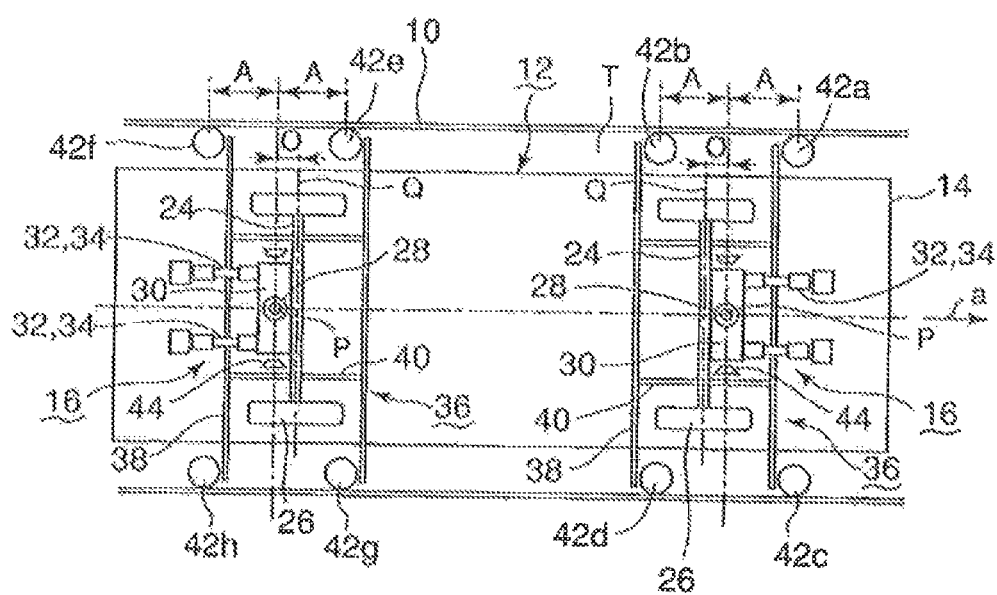
[FIG. 4] A plane view of a vehicle of a guide rail type using a bogie of a third preferred embodiment of the present invention.

Next, a third preferred embodiment of the present invention will be described in reference to FIG. 4 and FIG. 5. As illustrated in FIG. 4, a turning center P of the guide frame 36 (the center of the turning pin 28) is displaced by a distance O with respect to a center Q of the drive shaft 24 toward the edge side of the vehicle body in the front and rear bogies 16 in the traveling direction. The rest of the structure is the same as the first preferred embodiment illustrated in FIG. 1.

Figure 5:
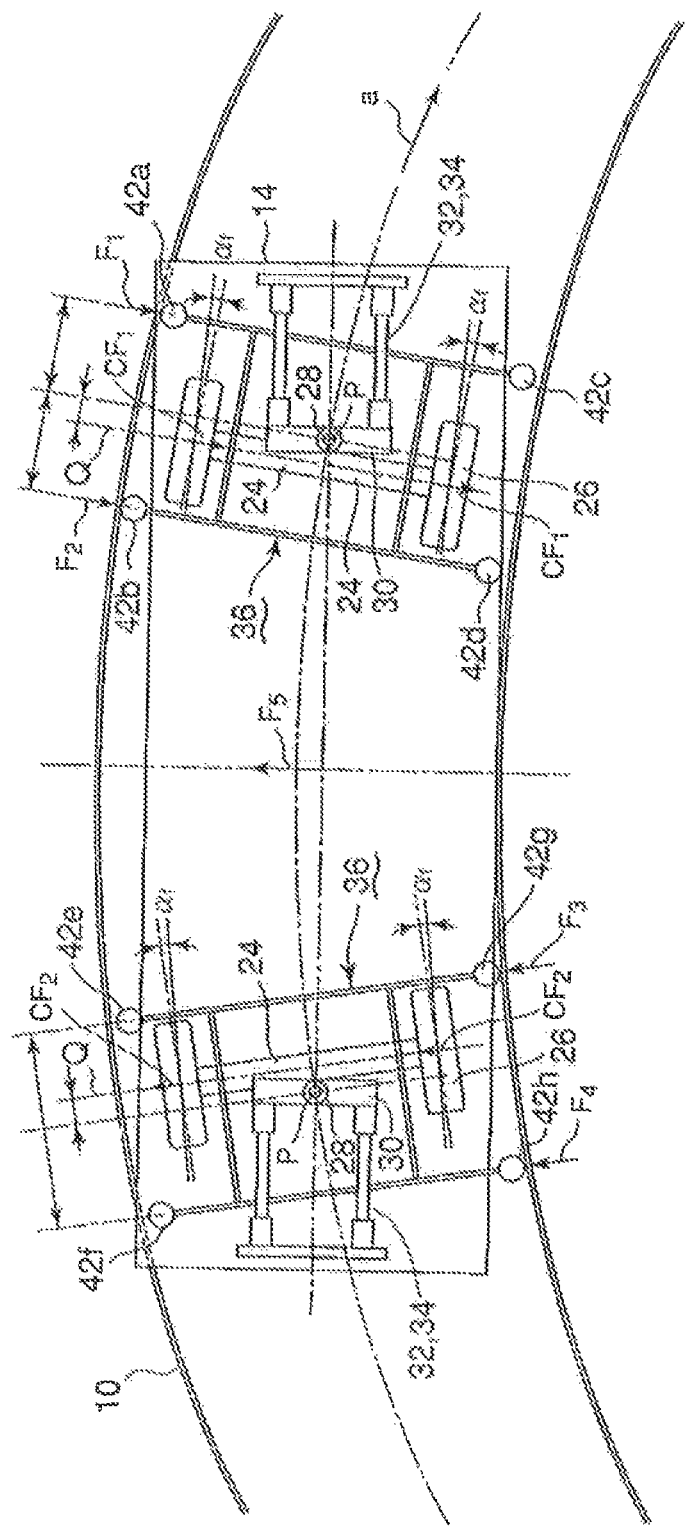
[FIG. 5] A plane view of the vehicle using the bogie of the third preferred embodiment traveling on a curved guideway.

FIG. 5 illustrates the vehicle 12 of the preferred embodiment passing the curved guideway. In FIG. 5, the bogie 16 is subjected to excess centrifugal load $F_5$ which is centrifugal force on the bogie 16 minus the amount reduced by a cant.

The turning center P of the guide frame 36 is displaced by the distance O with respect to the center Q of the drive shaft 24 toward the edge side of the vehicle and thus in the front bogie, the rubber tires 26 is directed to the center line of the guideway by the angle $\alpha_f$ with respect to a direction of the tangent to the curved guideway at the center Q of the rubber tires. Therefore, the rubber tires 26 are given a slip angle and the cornering force $CF_1$ is generated in the direction toward the inside of the curved guideway.

By this, the preferred embodiment can attain the following function effect in addition to that of the first preferred embodiment.

Specifically, the reaction forces F1 and F2 exerted on the front and rear guide wheels 42a and 42 on the inner side of the curve are reduced against the excess centrifugal force $F_s$ and thus the durability of the guide wheels 42a and 42b of the inner side can be improved. And the distance between the front guide wheels 42a and the center Q of the vehicle body (A+O) is longer than the distance between the guide wheels 42b of the center side and the center Q of the drive shaft (A−O). Thus, the reaction force exerted on the front guide wheels 42a becomes small by lever ratio so as to improve the durability of the guide wheels 42a. The running stability of the vehicle 12 can be further improved by the trailing effect of the above disposition of the guide frame 36.

In the same manner as the front bogie, in the rear bogie, the rubber tires 26 is directed to the center line of the guideway by the angle $\alpha_f$ with respect to a direction of the tangent to the curved guideway at the censer Q of the rubber hires. Therefore, the rubber tires 26 are given a slip angle and the cornering force $CF_2$ is exerted in the direction toward the inside of the curved guideway.

Contrary to the case of the front bogie, the reaction force is exerted on the guide wheels 42ga and 42h of the inner side when the vehicle travels on the curved guideway. As the $CF_2$ is exerted in the direction toward inside of the curved guideway, the reaction forces $F_3$ and $F_4$ exerted on the guide wheels 42g and 42h on the inner side are reduced and thus the durability of the guide wheels 42g and 42h of the inner side can be improved.

The reaction force exerted on the guide wheels 42 from the guide rail when the vehicle passes the curved section of the guideway can be calculated as below.

Reaction force of front bogie (edge side guide wheel),
$F_1$=(front, guide load)+(excess centrifugal load
$F_5/4$)−$(2\times CF_1 \times (A-O)/2A)$      (1)

Reaction force of front bogie (center side guide wheel), $F_2$=(rear guide load)+(excess centrifugal load $F_5/4$)−$(2\times CF_1\times (A+O)/2A)$      (2)

Reaction force of rear bogie (center side guide wheel), $F_3$=(front guide load)+(excess centrifugal load $F_5/4$)−$(2\times CF_2\times (A+O)/2A)$      (3)

Reaction force of rear bogie (edge side guide wheel), $F_4$=(rear guide load)+(excess centrifugal load $F_5/4$)−$(2\times CF_2\times (A-O)/2A)$      (4)

In the formulas, the guide load is a load needed to steer the rubber tires 26 against the each restoring force. And the excess centrifugal load $F_5$ is the excess centrifugal force exerted on the guide wheels 42 minus the amount reduced by the cant.

(Fourth Preferred Embodiment)

Next, a fourth preferred embodiment of the present invention will be described in reference to FIG. 6. In the preferred embodiment in the same manner as the second preferred embodiment, the connecting rod 54, the restoring rod 50, the turning damper 52 and the shock-absorbing rod 58 are provided in the bogie.

In addition to the function effect obtained in the third preferred, embodiment, the guide wheels can be directed in the straight direction by the restoring rod 50, the turning movement in the turning direction is restricted by the turning damper 52 and the impact loaded on the guide wheels from, the guide rail is absorbed by the shock absorbing rod 58.

(Fifth Preferred Embodiment)

Figure 6:
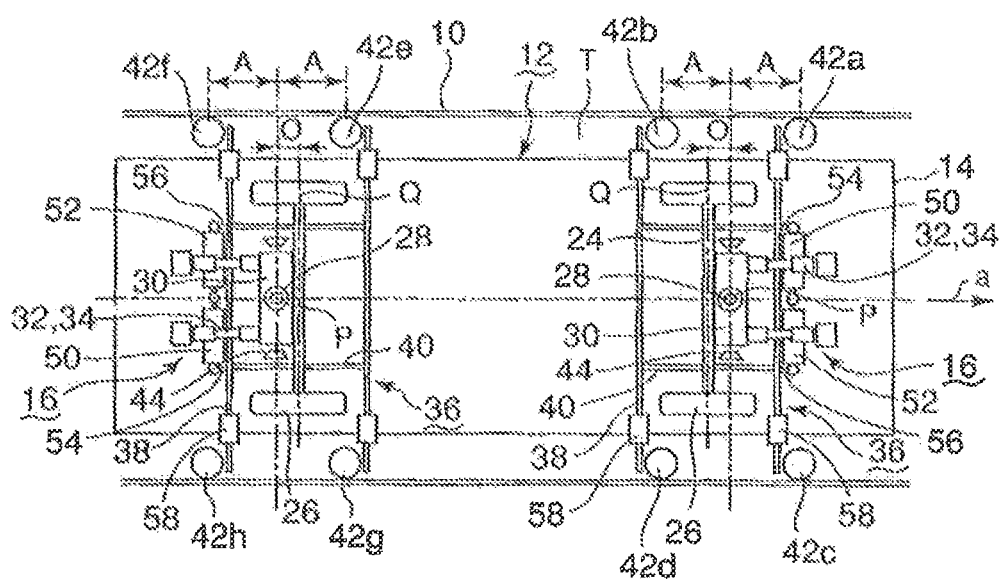
[FIG. 6] A plane view of a vehicle of a guide rail type using a bogie of a fourth preferred embodiment of the present invention.
Figure 7:
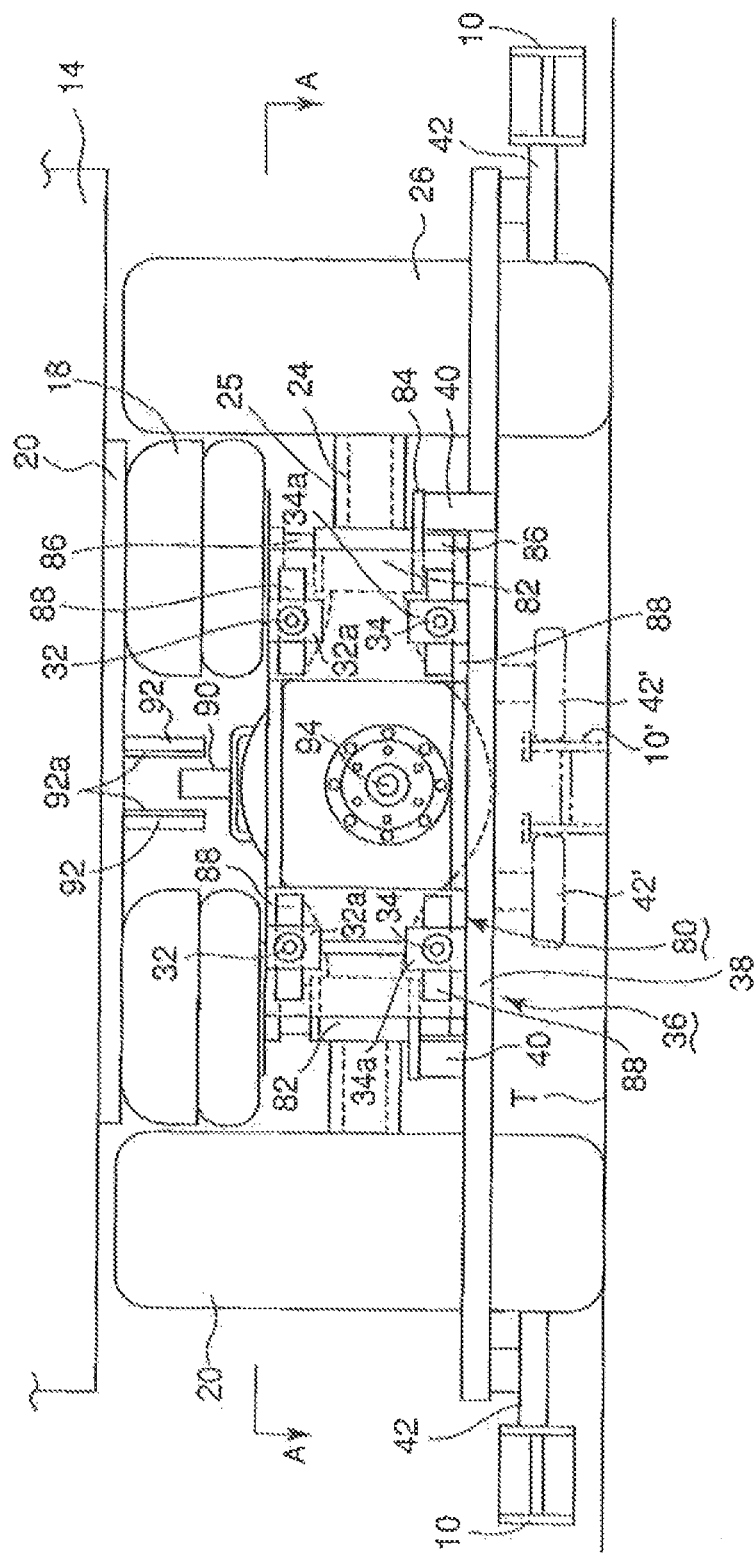
[FIG. 7] A front view of the bogie of a fifth preferred embodiment of the present invention.

Now, a fifth preferred, embodiment of the present invention is described in reference to FIG. 5 to FIG. 7. In FIG. 5 to FIG. 7, A base 20 integral no the suspension frame is fixed, to a bottom of the vehicle body 14. And two air springs 18 are installed on the base 20. The air springs 18 are arranged within the rubber tires and symmetrically about the center of the vehicle body in the lateral direction thereof.

The axle housing 25 is disposed below the air springs 18 horizontally in a lateral direction of the vehicle body and houses the drive shaft 24. The drive shaft 24 has the rubber tires 26 rigidly fixed on both ends thereof. The rubber tires are filled with gas and equipped with inner safety wheels.

A non-turning frame 80 which is squared U-shaped is arranged to surround the axle housing 25. The air springs 18 are mounted on a top surface of the non-turning frame 80. The guide frame 36 is arranged under the non-turning frame 80. In the same manner as the first and second embodiments, the guide frame 36 forms a lattice structure having two traverse bars 38 arranged in the front and back of the rubber tire 26 and two connecting bars 40 connecting the traverse bars 38.

Under the air springs 18, a square shaped bracket 82 is fixed to the axle housing 25 to surround it. The bracket 82 is connected to the connecting bar 40 of the guide frame 36 via as connecting plate 84. An arc-shaped turning bearing 86 is installed between the non-turning frame 80 and the bracket 82. By this, the drive shaft 24, the axle housing 25, the rubber tires 26 and the guide frame 36 can turn together. In the vehicle of the new transit system, the maximum turning angle of the drive shaft 24 is approximately ±6° so as to support the turning part.

On a side of the non-turning frame 80, one ends of the two upper traction links 32 and two lower traction links are connected movable. Specifically, at four places on the side of the non-turning frame 80, supporting shafts 88 are arranged so that bosses of the upper and lower traction links 32 and 34 can be fit therein movably. The other ends of the upper and lower links 32 and 34 are connected to she suspension frame fixed to the vehicle body 14.

A stopper 90 is projected upward on a top surface of the large part 25a of the axle housing 25. In contrast, a pair of stoppers 92 is attached to the bottom surface of the vehicle body 14 so that the stopper 90 is interposed between the pair of stoppers 92. The stoppers 92 have elastic rubber plates respectively on an inner surface thereof so as to absorb the impact against the stopper 90. Between the stopper 90 and the opposing stoppers 92, a clearance in the amount of an allowable limit value of the displacement between the vehicle body 14 and the bogie 16 is provided. By this, when the displacement reaches the allowable limit value, the stopper 90 and the opposing stoppers 92 lock with each other so that the relative displacement amount does not exceed the allowable limit value.

A propeller shaft not shown in the drawings is connected to the large part 25a of the axle housing 25 from the drive motor in the longitudinal direction of the vehicle body. By this, the rotation of the drive motor is transmitted to the rubber tires 26 via a hypoid gear, differential gears and the drive shaft 24.

As illustrated in the drawing, the turning center P of the guide frame 36 is on the centerline Q of the drive shaft in this preferred embodiment.

In addition to the functional effects obtained in the first preferred embodiment, according to this preferred embodiment, the turning part (the drive shaft 24, the axle housing 25, the rubber tires 26 and the guide frame 36 and so on) is supported turnably between the non-turning frame 80 and the bracket surrounding the drive shaft 24 so as to turn the turning part smoothly and improve the supporting strength of the turning part.

Figure 8:
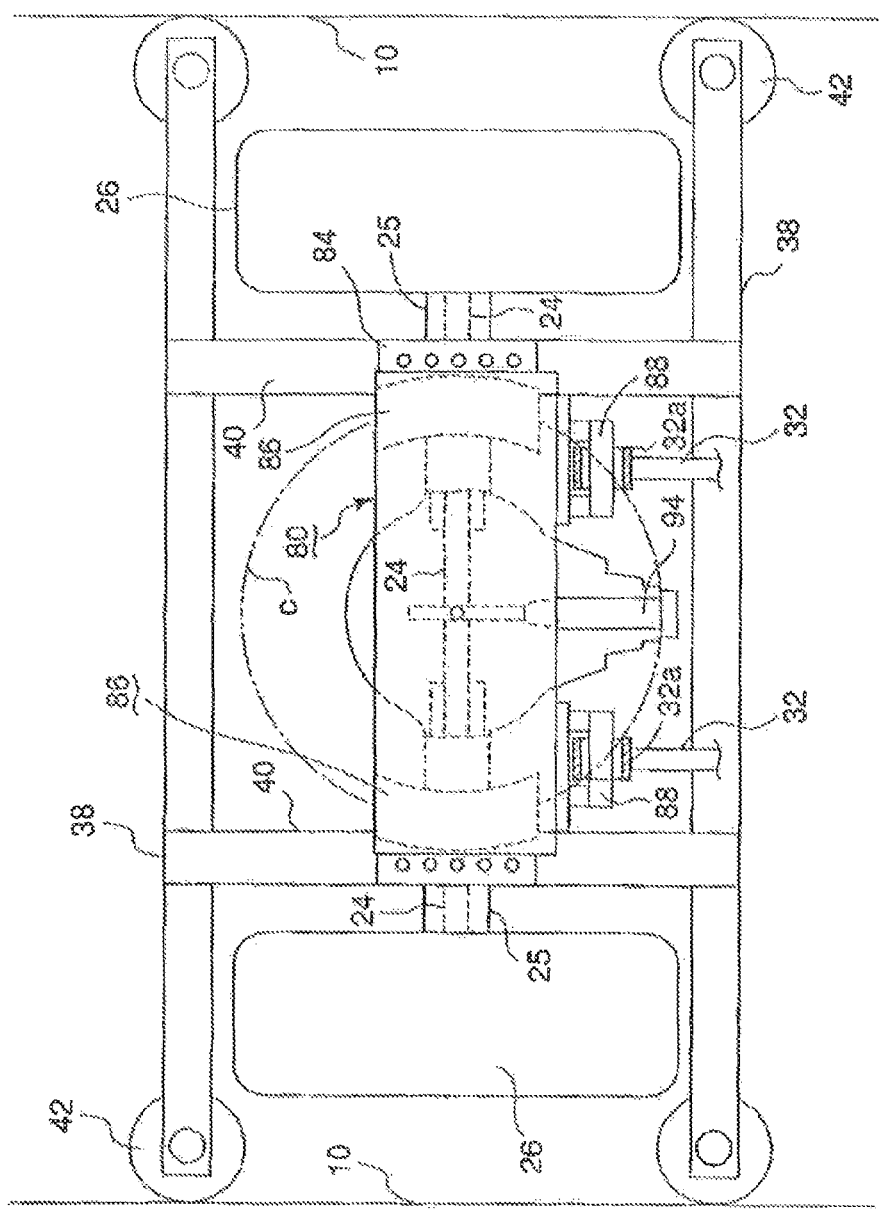
[FIG. 8] A plane view of the bogie of the fifth preferred embodiment.
Figure 9:
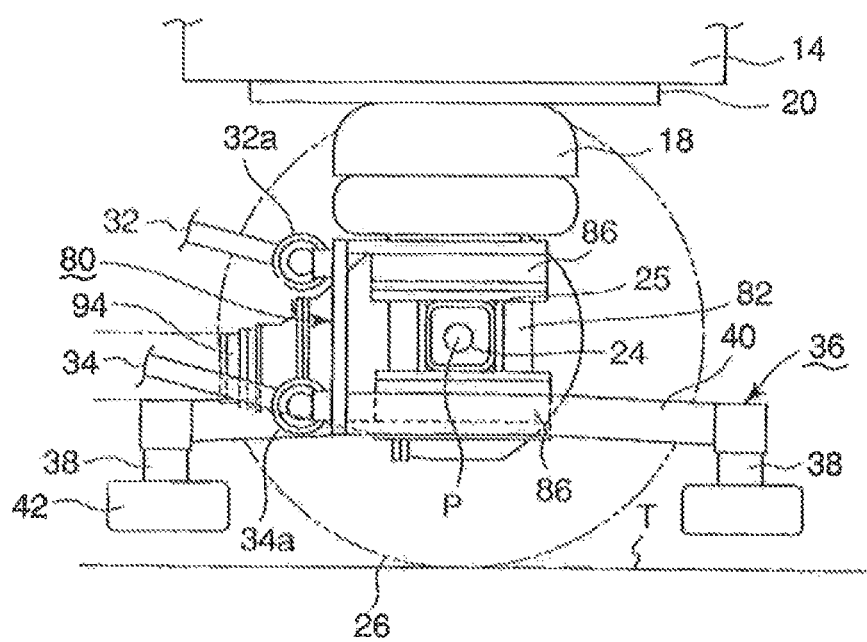
[FIG. 9] A side view of the bogie of the fifth preferred embodiment.

According to the preferred embodiment, the arc-shaped turning bearing 86 is provided. However, a ring-shaped bearing may be used instead of the arc-shaped shaped bearing in a position indicated with a dotted line C in FIG. 8. By this, the supporting strength of the non-turning part is further improved.

Further, it is also possible to arrange the guide rail 10' instead of the pair of guide rails 10 arranged on both sides of the guideway T, in such a manner that one guide rail arranged in a center T of the guideway is interposed between the guide wheels 42' from both sides thereof

INDUSTRIAL APPLICABILITY

According to the present invention, in the bogie for the vehicle of the guide rail type being guided by a guide rail, the durability of the bogie can be improved and the number of components can be reduced by reducing the load on guide wheels and improving the rigidity of bogie components such as a guide frame.

The invention claimed is:

1. A bogie for a vehicle guided by guide wheels configured to rotate while keeping contact with a guide rail arranged along a guideway of the vehicle, wherein the bogie including an axle is arranged below air springs fixed to a bottom of a vehicle body, the bogie comprising:
a guide frame which includes a pair of transverse beams and a connecting member arranged between the pair of the transverse beams, each of the traverse beams being equipped with the guide wheels rotatably on both ends thereof;
the axle supported on a non-turning part of the bogie such that the axle is capable of turning; and
running wheels attached to both ends of the axle,
wherein the running wheels are rigidly fixed to the axle and the guide frame is fixed to the axle so as to steer the guide frame, the axle and the running wheels integrally,
wherein the guide frame and the axle are supported rotatably around one of turning shafts and an annular or arc bearing disposed at a center of the bogie, and
wherein the non-turning part of the bogie is connected to a body of the vehicle via a traction link arranged in a longitudinal direction of the body of the vehicle.

2. The bogie for the vehicle according to claim 1, further comprising:
stopper members respectively arranged on the axle and the vehicle in such a position that the axle and the vehicle is able to be locked with each other by the stopper members, the stopper members locking with each other so as to suppress a relative displacement between the axle and the vehicle body in a lateral direction of the vehicle that exceeds an allowable limit value when the displacement reaches the allowable limit value.

3. The bogie for the vehicle according to claim 1, wherein the guide wheels are arranged so that a distance between outer edges of the guide wheels on a center side of the vehicle body in a longitudinal direction is smaller than a distance between outer edges of the guide wheels on an edge side of the vehicle body in the longitudinal direction.

4. The bogie for the vehicle according to claim 1, wherein the guide wheels disposed on a center side of the vehicle body in a longitudinal direction have a rigidity less than the guide wheels arranged on an edge side of the vehicle body in the longitudinal direction.

5. The bogie for the vehicle according to claim 1, wherein a turning center of the guide frame is displaced with respect to a center of the axle toward the edge side of the vehicle body when the bogie is mounted on the front side or rear side of the vehicle body in the traveling direction.

6. The bogie for the vehicle according to claim 1, further comprising:
a restoring device for applying to the guide frame a restoring force that directs the guide wheels in a straight-advancing direction; and
a damper for suppressing a drastic turning movement of the guide frame.

7. The bogie for the vehicle according to claim 1, further comprising:
a shock absorber chosen from a spring shock absorber or a rubber shock absorber arranged on the guide frame and absorbing impact loaded on the guide wheels from the guide rail.

* * * * *